United States Patent [19]

Frantz et al.

[11] Patent Number: 5,027,316
[45] Date of Patent: Jun. 25, 1991

[54] VERSIONING OF MESSAGE FORMATS IN A 24-HOUR OPERATING ENVIRONMENT

[75] Inventors: Billy J. Frantz, Clontarf, Australia; Sven E. Hellstrom, Vallingby, Sweden

[73] Assignee: International Business Machines Corporation, Armonk, N.Y.

[21] Appl. No.: 391,093

[22] Filed: Aug. 8, 1989

Related U.S. Application Data

[63] Continuation of Ser. No. 906,109, Sep. 11, 1986, abandoned.

[51] Int. Cl.⁵ .............................................. G06F 15/40
[52] U.S. Cl. ................................ 364/900; 364/958.3; 364/942.2; 364/967.4
[58] Field of Search ... 364/200 MS File, 900 MS File

[56] References Cited

U.S. PATENT DOCUMENTS

| | | | |
|---|---|---|---|
| 4,068,300 | 1/1978 | Bachman | 364/200 |
| 4,399,504 | 8/1983 | Obermarck et al. | 364/200 |
| 4,432,057 | 2/1984 | Daniell et al. | 364/300 |
| 4,558,413 | 12/1985 | Schmidt et al. | 364/300 |
| 4,627,019 | 12/1986 | Ng | 364/900 |
| 4,658,351 | 4/1987 | Teng | 364/200 |

Primary Examiner—Allen R. MacDonald
Assistant Examiner—Debra A. Chun
Attorney, Agent, or Firm—Baker, Maxham, Jester & Meador

[57] ABSTRACT

Method and apparatus for maintaining currency in interrelated data which is referred to but not varied by users in a multi-user system which is on-line for 24 hours a day. Reference is had to the data through a data indexing construct available to each user. Currency is maintained by adding updated elements of the data when required by changed external conditions and storing the updated elements in the multi-user system concurrently with the previous version. A new indexing construct is built for the updated data version and users are switched to the construct when access to prior data elements is no longer required. Since only a single variable relating to the indexing construct must be changed in order to switch a user, an atomic operation is utilized to perform the switching.

4 Claims, 4 Drawing Sheets

VERSIONING OF MESSAGE FORMATS IN A 24-HOUR OPERATING ENVIRONMENT

This is a continuation of application Ser. No. 06/906,109, filed Sept. 11, 1986, abandoned.

BACKGROUND OF THE INVENTION

This invention relates to the operation of a multi-user system in which data referred to but not varied by the users are updated while the system operates on a 24-hour a day basis. More specifically, the present invention relates to a method and means for managing process reference to data which allows the data to be resident in storage for the duration of system operation and to be reached without the use of system locks, even though dynamic change to the data is taking place. With still greater particularity, the invention relates to a method for managing message format data elements resident in a multi-programming or multi-processing host computer and accessed by a plurality of message processes without the use of exclusion mechanisms such as locks, even though message processes are gaining access to the message format data at the same time that the format data is being updated and interrelationships within the data elements require that sets of elements be changed concurrently.

The problem of exerting control over the access of concurrent processes to variable data is known in the art. When one executing process in a multi-tasking system makes reference to a variable data object, the integrity of the data object must be protected against the action of another executing process.

The solution to this problem has been to synchronize concurrently-executing processes in order to prevent one process referring to a variable data object simultaneously with another process altering the data object. Hwang and Briggs in the work entitled COMPUTER ARCHITECTURE AND PARALLEL PROCESSING, McGraw-Hill, Inc., 1984 propound two types of synchronization: mutual exclusion and condition synchronization. Mutual exclusion involves giving exclusive use of a variable data object to one of a plurality of simultaneously executing processes. Condition synchronization establishes a condition variable that indicates the availability of a shared data object. Each process requiring access to the shared data object first inspects the condition variable to determine whether another process is using the shared data object. When a process uses the data object, it places the condition variable in a state indicating the object is in use, and reconditions the variable when it has finished its use of the object. Processes awaiting access to the shared data object customarily suspend execution until access is available.

The practicable implementations of serialization are found in mechanisms such as locks and semaphores. The IBM/370 described in IBM Publication No. SA 22-7085-0 also provides a family of atomic operations that are useful for serialization. These atomic operations test and modify a condition variable in a single read-modify-write instruction cycle. The atomic operations are completed in one cycle so that the condition variable is not tested and set by another process before the currently-executing process completes its operation. Thus, the operations are "atomic" in the sense that they either succeed completely in altering the condition of the condition variable or fail, in which case the variable is left unchanged.

U.S. Pat. No. 4,399,504 of Obermarck teaches the use of lock management to control access to data resources shared by two or more central electronic complexes. U.S. patent application Ser. No. 787,221, filed Oct. 15, 1985, entitled "Extended Atomic Operations," and assigned to the assignee of this application describes the use of atomic operations such as the compare and swap instruction to permit simultaneously-executing processes to concurrently access variable data objects.

A problem related to, but distinguishable from that of serialization of access to shared variable data objects arises in the context of updating interrelated data objects in a system which operates continuously with no provision for interruption and permits passive reference to the data objects by a plurality of users. Thus, in the prior art IBM IMS (Information Management System)/VS (Virtual Storage) product, a service denoted as MFS (Message Format Service) maintains a library of message format descriptors. In this regard, a descriptor is a set of one or more message attributes. The descriptors in the IBM MFS are used to establish message format abstractions in multi-user systems which support the concurrent execution of a plurality of interactive application programs. For example, a banking system may include a number of remote electronic tellers connected to a central computer to provide banking services to bank customers outside of the bank. A banking transaction is conducted between a customer and the central computer through an electronic teller by means of a transaction application program resident in the central computer that supports interaction between the customer and the teller. Such interaction can take place, for example, through a screen in the electronic teller which provides messages to the customer, and an electronic keyboard panel through which the customer provides messages to the teller.

The formats of the messages are standard and are characterized by data elements called message input descriptors (MID) and message output descriptors (MOD). In this regard, a MOD establishes the format of an output message which is generated by a host computer application program destined for a terminal in terms of message length, numbers of fields, size of fields, and data element types. The MID establishes the format of input messages from the terminal destined to the host computer application in a similar manner.

Differing terminal devices require unique datastream formats and control characters embedded in messages. Thus, for each type of terminal device, a device format description is also provided in a device input format (DIF) and device output format (DOF). The IBM MFS uses a MID/DIF combination to convert a terminal-generated input message into the proper format and content for processing by the application program and uses a MOD/DOF combination to convert the application program output into the datastream format and content required by the terminal device, thus making the application independent of the various requirements of specific individual devices.

The relationship between these pairs of elements requires that they be changed in sets rather than individually. Thus, changing a MOD can require changing one or more DOF's.

Further, it is known that data structures such as format records are maintained in data files and that access to such files can be provided by any one of a number of data base access methods. One common access technique is referred to as "indexing," wherein data structures are stored and retrieved on the basis of keys that are within and form a port of each data structure. Two well-known methods of indexing are file indexing and hashing.

File indexation is based upon existence of an index file which associates a pointer with a specified value for a particular data structure field. The pointer indicates the storage location of a data structure having the specified value in the particular field.

Hashing is a method of indexation wherein the name (key) of a data structure is mathematically manipulated to derive an entry in a file called a "hash table." Each hash table entry points to a hash address associated with one or more named dta structures.

Characteristically, in the 24-hour day operation of an electronic banking system, MID's, MOD's, DIF's, and DOF's (referred to collectively hereinafter as message format descriptors) must be available without interruption to support electronic teller transactions at any time of day. However, when it is the case that the message format descriptors must be updated to reflect changed external conditions, the problem of access to the format elements takes on a different complexion than the problem of access serialization to shared variable data resources. In this regard, concurrent access to the format elements must be provided to the electronic tellers without interruption in order to maintain the continuity of banking services. The message format descriptors are also potentially in use for a long time if a terminal is left unattended. The relationship between the elements is complex and may require the changing of dozens of descriptors simultaneously to effect a desired overall format change. If a descriptor is altered, any electronic tellers currently displaying messages which use it must continue to use the old version until the transaction is complete. Electronic tellers receiving messages after alteration of a format may use a new descriptor to display the messages. Thus, the ability to gain access to the old elements as well as the new by different electronic tellers is required.

In the interest of maximizing overall system performance, since message format data is highly utilized (a set of four elements per transaction is required, including MID, MOD, DIF, and DOF) and change to these elements in a system in operation is infrequent, any technique of changeover which is utilized must not add to the overall time of message processing. This consideration effectively eliminates the use of a standard process synchronization technique such as the lock discussed above, since such a technique is time-consuming.

Further, since a change of descriptors for any individual terminal must be made between transactions and since transactions in a large network are in a constant state of overlap, processing would have to be suspended for a period of time to permit a change to occur. In a production environment, this approach becomes impractical.

Therefore, there is an evident need for a technique and a system to manage message format data which allows the data to be resident in system storage for the duration of process execution, and to be accessed without the use of time-consuming serialization techniques even though dynamic change to the formats is occurring.

SUMMARY OF THE INVENTION

It is, therefore, an object of this invention to provide a method and means for managing format data files which permits change to the files in an interruptable, multi-tasking computer environment.

A further object of the invention is to assure independent access to different versions of the same format data in an interruptable multi-tasking environment without the need for locks.

The invention is underpinned by the critical observation that updating of data structures referenced by processes which do not vary the data structures in an interruptable environment can be accomplished by inserting a point-manipulative level of indirection between the structures and the referencing tasks, which will permit versions of the data structures to be switched using an atomic level instruction without interruption of the multi-tasking environment.

According to the invention, a multi-user system, including at least one central or host computer to which is connected a plurality of terminals, is characterized in employing a multi-tasking mode of operation. In this regard, a task can be a program, in which case the mode of operation would be referred to as "multi-programming" and would provide for the interleaved execution of two or more application programs by the central processor. If a task is considered to be a process, a sequence of operations resulting in an identifiable outcome, which executes in parallel with other, currently-executing processes, the operational mode is considered to be "multi-processing."

Currency of data utilized by the tasks in such an environment is assured by a multi-step method for versioning of the data. The method includes, first defining and storing a current version of one or more data elements. Next, an index counterpart to the current data elements is created. Finally, upon the event of a task initially referencing one of the data elements, the current version of the index is bound to the referencing task, thereby preventing an interruption of the referencing task while the change of data elements occurs.

From another aspect, the invention is expressed as a method for assuring independent access to different versions of the same data element in an interruptable multi-tasking environment without locks. This aspect of the invention includes first, defining and storing message format descriptors and creating a first index counterpart to the descriptors which includes a first index term identifying the first index counterpart. Next, at least one new message format descriptor is defined and stored and a second index counterpart to the new descriptors is created which is independent of the first index and which includes a second index term identifying the second index. Finally, an atomic level instruction is executed by one of a plurality of independent tasks, the execution employing the first and second index terms as arguments to effectuate switchable access among the message format descriptors.

The achievement of the above objects and other attendant advantages of the present invention will become evident when the following detailed description of the preferred embodiment is read while reference is made to the below-described drawings.

DETAILED DESCRIPTION OF THE PREFERRED EMBODIMENT

Figure 1:
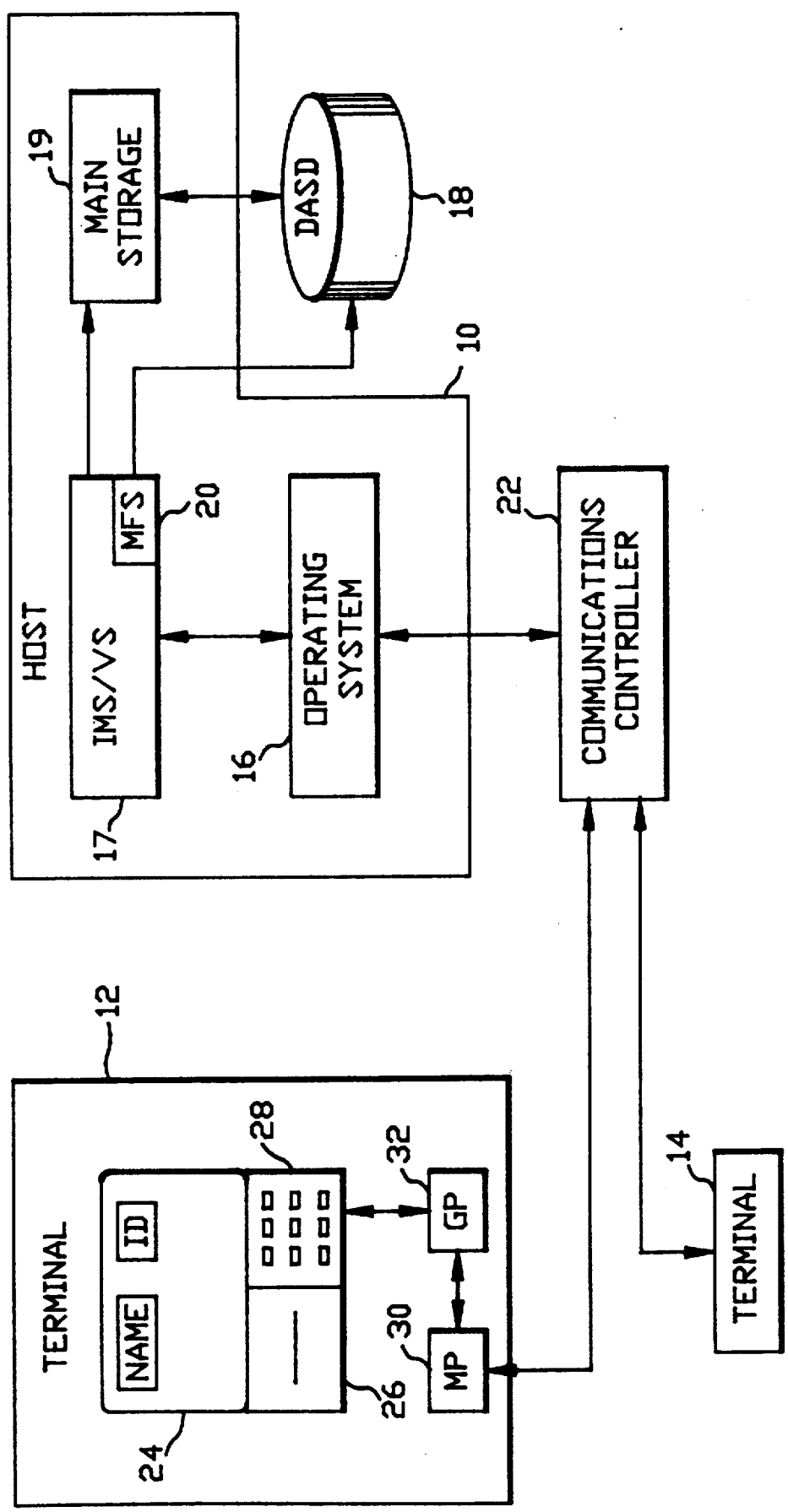
FIG. 1 is a block diagrammatic representation of a multi-tasking system in which a plurality of terminals are employed to provide message communications between a host computer and users of the terminals.

A multi-tasking computer system for supporting multi-user operation is illustrated in FIG. 1. The system includes a host computer 10 connected to exchange message communications with a plurality of user terminals, two of which are indicated by 12 and 14. The host computer 10 is programmed with and operates under the control of a multi-tasking operating system 16, such as the IBM System/360 or /370 operating systems, IBM Publications GS 22-6534, GC 280661, and GC 20-1800. As is known, an operating system such as the operating system 16 may have an information management system 17 such as the IBM product IMS/VS which permits the users of the terminals connected to the host computer 10 to gain access to a computer-maintained database resident in a direct access storage device (DASD) 18 through the remote terminals 12 and 14. The host computer 10 also includes a main storage 19, which contains data necessary for the processor program currently executing. The IMS/VS executes under control of the operating system 16 and utilizes resources of the host computer 10 for moving information between the DASD 18 and main storage 19. The IMS/VS also operates cooperatively with a conventional communications controller 22 to schedule and execute message communications between the host computer 10 and the remote terminals 12 and 14. Communications can be initiated either by a terminal or by the IMS/VS 17.

The terminal 12 includes an integrated equipment array which can consist of, for example, an output message device such as a CRT 24, which provides visual output messages to a user, and input message devices such as a magnetic card reader 26 and an alphanumeric keyboard 28, intended for receiving input messages from a user. The terminal 12 includes a message processor 30 and a graphics processor 32. The graphics processor 32 is configured to drive the output message device 24 in response to messages received from the host computer 10 via the message processor 30. The graphics processor 32 is also capable of mapping input messages from the input message devices 26 and 28 to the message processor 30, which formats the messages for submission to the host computer 10.

When operated by a user, the terminal 12 permits the user to utilize the facilities of the host computer 10 to select and execute an application program. In this regard, execution of an application program through the terminal 12 will involve a series of transactions. A transaction is taken to mean an exchange between the terminal 12 and the host computer 10 that accomplishes a particular result in the application program. For example, the transaction can consist of the transfer of funds between accounts of the customer. Each transaction has the potential of involving one or more messages input to the host computer 10 through the terminal 12 and one or more messages output to the user from the host computer 10 by way of the terminal 12. For each message the message formats are specified by a particular MID or MOD. Further, the device-specific characteristics of the terminal 12 which must be accounted for in structuring the messages are specified for the message by a DIF or DOF.

For each message, the IMS/VS 17 dispatches the MFS 20 to obtain a set of MID/DIF's or MOD/DOF's, referred to collectively as message format descriptors.

Since the system of FIG. 1 is a multi-user system, one or more terminals can be conducting separate transactions with the host computer 10 at any one time. The multi-tasking characteristics of the operating system 16 and the IMS/VS 17 permit the host computer 10 to conduct the transactions simultaneously according to one of the above-described multi-tasking operational modes.

Figure 2:
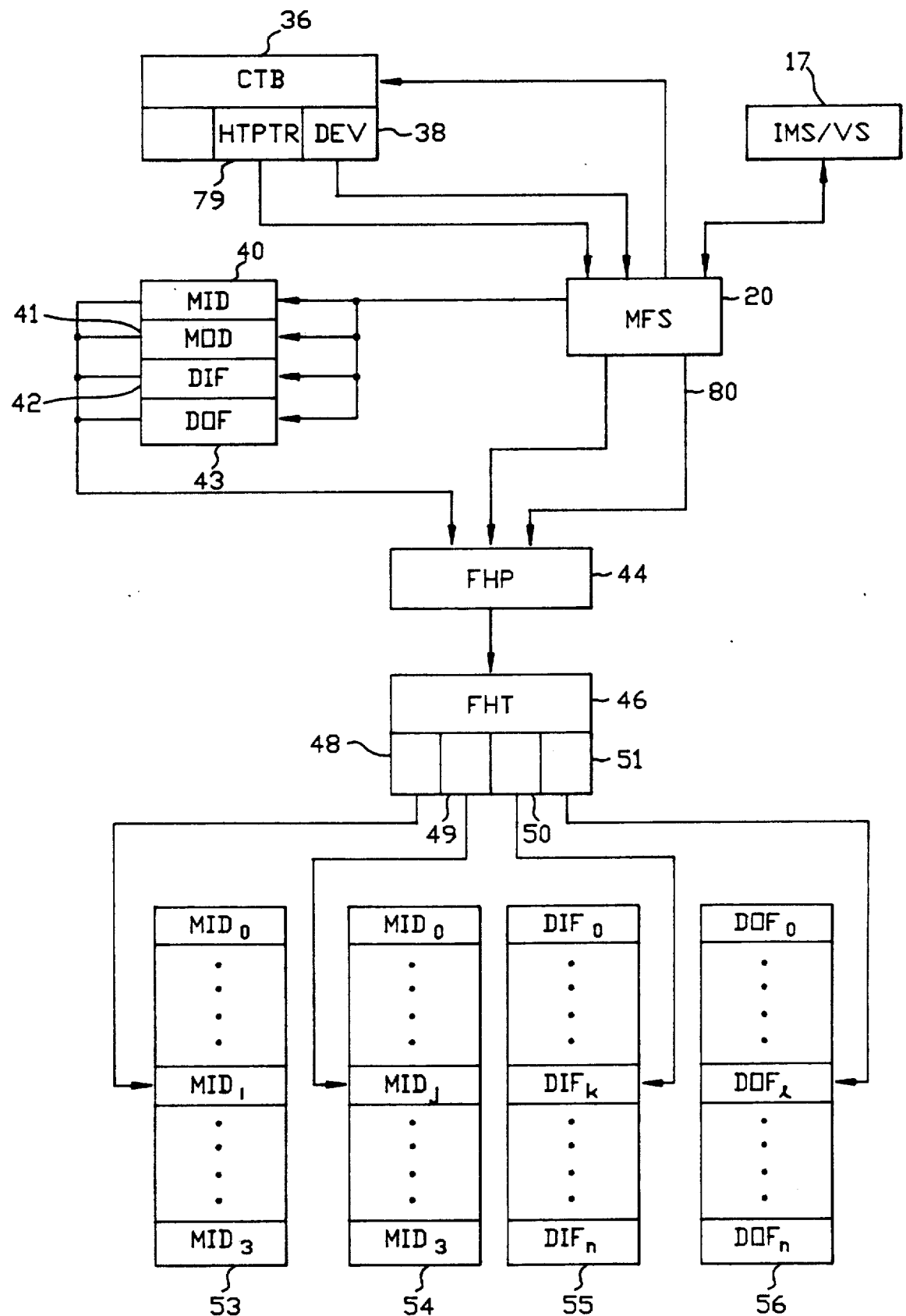
FIG. 2 is a block diagram illustrating, in greater detail, the interconnection between an executing message task and a plurality of message format descriptors.

In FIG. 2, the IMS/VS 17 dispatches the MFS 20 in response to receipt of a message from one of the terminals. When dispatched, the MFS 20 receives an indication of the message and the source terminal from the IMS/VS 17. In its previously-available form, the MFS 20 responds to a summons from the IMS/VS by obtaining a communications terminal block (CTB) 36 which is specially constructed for the terminal from which the message originated. As is known, the Communications Terminal Block is built, one for each terminal permitted to attach to the system, during the IMS definition process.

The CTB 36 includes a device identifier (DEV) indicating the type of input and output devices included in the terminal. The MFS 20 uses the message and device indicator to obtain, by known means, the names for the message and format descriptors required for the message. This is indicated in FIG. 2 by MID 40, MOD 41, DIF 42, and DOF 43. The names of the message format blocks are provided, together with other necessary control information, to a format hashing process (FHP) 44. The hashing process 44, which is conventional, responds to the message format data names and other control information provided by the MFS 20 by producing indices to a format hashing table (FHT) 46. The indices provided by the FHP 44 correspond to respective entries in the FHT 46, with each entry including a respective one of the pointers 48–51. Each pointer indicates a location (a "hash address") in the main storage 19 where a message format data file named by the MFS 20 resides. The storage structure for the message format data file is illustrated in FIG. 2 as lists 53–56.

Figure 3:
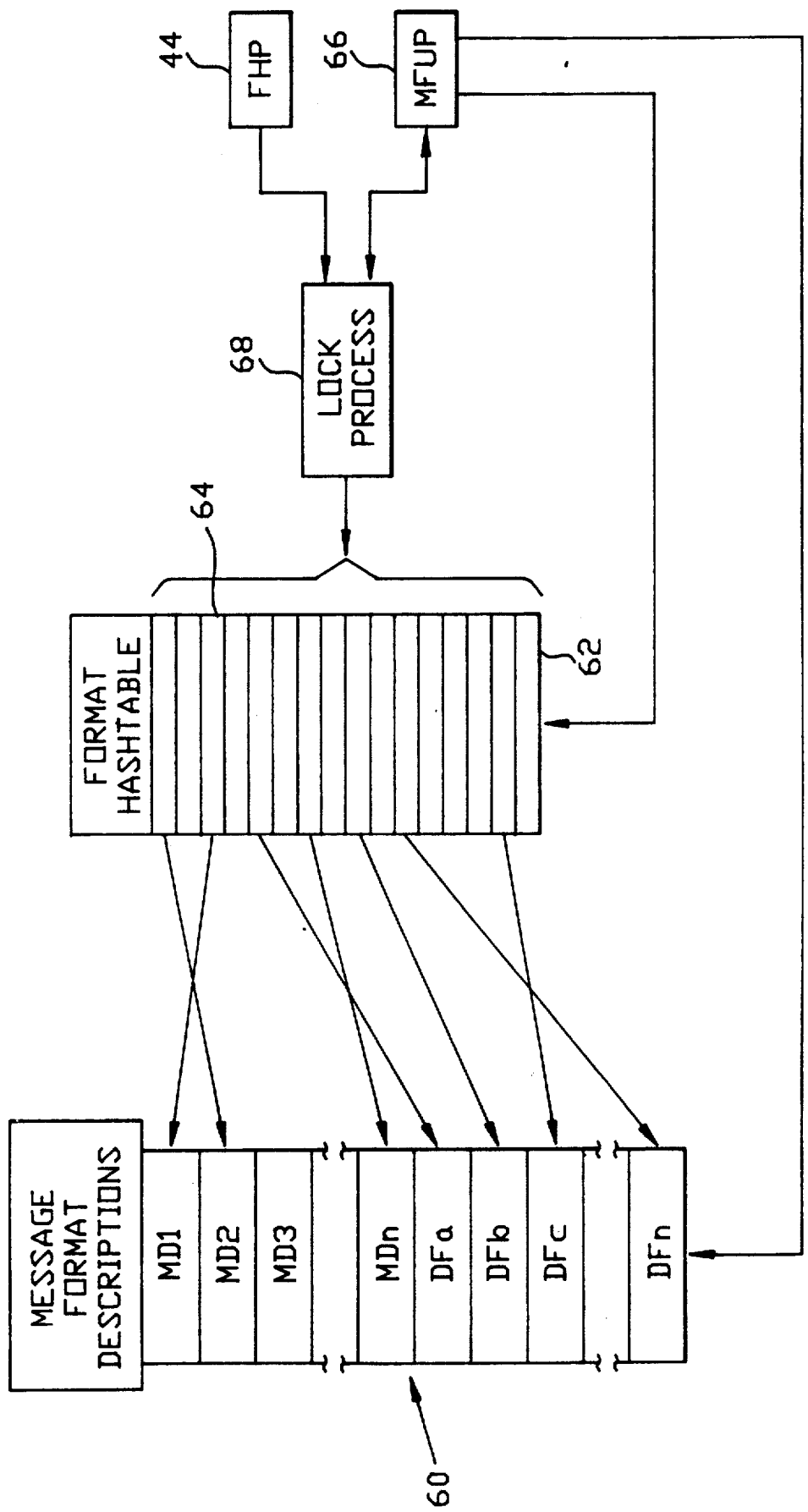
FIG. 3 is a block diagram illustrating how a lock procedure would be used in a conventional manner to serialize access to message format resources and prevent access to the resources while they are being updated.

When message format descriptors must be updated, one approach to altering them, using a conventional lock process, is illustrated in FIG. 3. In FIG. 3, message input and output descriptors are indicated generically by the mnemonic MD, while device input and output formats are denoted by DF. In FIG. 3, the message format descriptors are all shown in a single list of message format descriptors 60. The message format descriptor list 60 is indexed through the format hash table 62. In FIG. 3, it is assumed that the message descriptors MD1 and MD3 are synonymous. In this regard, a synonym is a message format descriptor whose name randomizes to the same entry 64 of the format hash table 62 as another descriptor. For updating, a message format update procedure (MFUP) 66 is available to system configuration control personnel for adding or altering entries in the message format descriptor list 60. At the same time that the message format descriptor list 60 is being updated or altered, corresponding changes may be made to the format hash table 62 so that indexation to the data is preserved. In order to deny access to the FHP 44 while update procedures on the message format descriptor list 60 and format hash table 62 are being undertaken, a lock process 68 is employed. As is known, a lock process such as the process 68 will provide mutual exclusive access to the hash table 62 and format record list 60. The mutual exclusivity obtains between the FHP 44 and MFUP 66; the lock process prevents one gaining access when the other has it. Therefore, when the lock process provides access to the hash table and format record list to MFUP 66, the FHP 44 must await access until the updating is completed. As stated above, this can result in an intolerable interruption of the operation of a 24-hour system.

Figure 4:
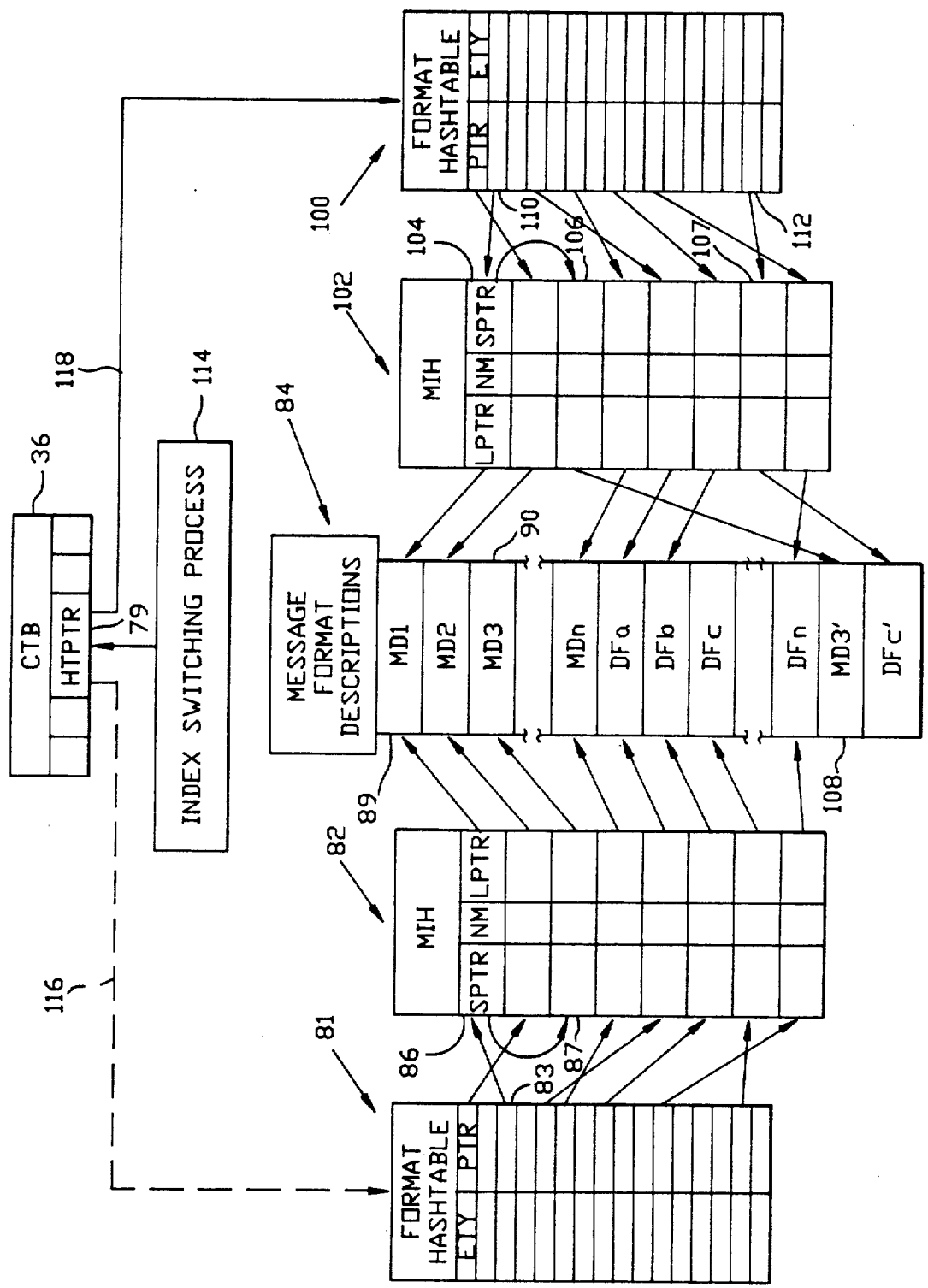
FIG. 4 is a block diagram of the data structures necessary to support the addition or deletion of message format resources according to the invention.

Refer now to FIG. 4 for an understanding of the invention, the data structures required for practice of the invention, and an explanation of the invention's operation. Preparatory to a detailed description, it is observed that in a virtual storage system where virtual storage requirements exceed main storage capacity, the likelihood of a given message format descriptor being in main storage at any specific time is fairly low due to the large number and size of the descriptors and their random access. As explained above, in order to provide rapid access to the message format data, the descriptors can be loaded in the main storage and addressed via the FHP, which randomizes the name of each message format descriptor to a hash table pointer. Since synonyms can occur, it is possible to actually access several descriptors before the desired descriptor is found. Thus, it can be seen that if the hashing procedure and format names cause the named message format descriptors to be on a synonym chain, high paging rates may result. In this regard, paging is taken to be the transfer of information storage units called "pages" between the main storage 19 in the host computer 10 and the direct access storage device 18.

To avoid high paging rates in the practice of the invention, an intermediate data structure called a message intermediate header (MIH) is therefore created which contains, among other things, the synonym chains required to trace down message format descriptors which hash to the same hash table entry as other message format descriptors. Since the entries in the MIH are quite small and accessed rapidly, the likelihood of a page fault is low. Thus, by adding one more level of indirection to the conventional hashing technique, the average page cost in practicing the invention is reduced significantly.

In the practice of the invention, the hashing table used by the format hashing procedure is named by a hash table pointer (HTPTR). The HTPTR is indicated by 79 in FIGS. 2 and 4. In the practice of the invention, when a terminal is conducting a transaction, the terminal's CTB 36 is obtained and the HTPTR 79, the DEV 38, and the message descriptor name are all provided to the MFS 20. The MFS 20 then provides the hash table pointer to the FHP 44, the indicated hash table is obtained, and the hashing procedure is initiated using the named hash table.

In FIG. 4, the HTPTR 79 of the CTB 36 points initially to a format hash table 81. The message format descriptor names provided by the MFS 20 hash to entries (ETY) in the format hash table 81, each of which includes a pointer (PTR) which points to a respective one of the entries in the MIH 82. Each entry in the MIH 82 contains at least three fields: a NM field containing the name of a message format descriptor and a LPTR field comprising a list pointer to the location in the list of message format descriptors 84 where the named descriptor is stored. The list includes message descriptors MDl-MDn and device formats DFa-DFn. For example, the MIH entry 86 includes the NM and LPTR fields described above, as well as a synonym pointer SPTR which points to another entry 87 in the MIH. In this manner, assuming that MDl and MD3 both hash to the entry 83 in the hash table 81, MD3 will be located by first moving to the entry 86 of the MIH and then employing a conventional chain searching technique to locate the MIH entry 87 whose NM field contains the name of MD3 and whose LPTR field points to the storage location of MD3.

Assume next that the message format list 84 is to be updated by altering message descriptor MD3 and device format DFc. The altered versions of the format blocks are added into the message format descriptor list 84 and are identified in FIG. 4 as MD3' and DFc'. It is noted that updating MD3 and DFc is accomplished by simply inserting new descriptors rather than by modifying existing ones. When the descriptors are updated in this manner, another format hash table 100 and MIH 102 are built. Entries in the MIH 102 which point to the unaltered blocks in the message format descriptor list 84 are identical to the corresponding entries in the MIH 82. However, entries 106 and 107 in the MIH 102 now point to the updated message format data blocks MD3' and DFc'. In addition, the hash table 100 is so constructed that the format data block names MD3 and DFc now hash to table entries 110 and 112, respectively, which point to MIH entries 106 and 107. Finally, it is observed that MDl and MD3 are still synonymous, both hashing to entry 110 in the hash table 100. Thus, it can be seen that the MIH entry 104 that points to MDl in the message format descriptor list 84 must also be updated in its SPTR field to point to the new entry 106.

With the preceding description, it will be evident that message format versioning can be implemented on a user-by-user basis through an index switching process 114. In this regard, the index switching process will be dispatched by the IMS/VS 17 during a transaction with a terminal. The index switching process 114 executes against the HTPTR in the terminal's control block. Thus, at an appropriate point in a transaction with the terminal 12, the IMS/VS 17 dispatches the index switching process 114 to change the pointer in the HTPTR 79 of the CTB 36 from the hash table 81 to the hash table 100. This change is represented by the dashed line 116, which indicates indexation to the hash table 81 prior to dispatching the index switching process and by the solid line 118, which indicates indexation to the hash table 100 after dispatching the switching process.

With the description of the invention in connection with FIG. 4, it should be evident that on-line changes and additions to message format descriptors can be accomplished without interrupting the operation of a 24-hour system or utilizing inefficient procedures such as locks. Procedures for implementing the invention are given in Tables I and II. As will be apparent to the practitioner, Tables I and II are pseudocode representations which, together with the accompanying description, will enable those skilled in the art to generate, without undue experimentation, the necessary machine-executable instructions to operate a general purpose computing system according to the method of the invention. It should be obvious that description of the invention by means of source and/or object code of a working implementation would tend to obscure the inventive subject matter in extraneous detail and attenuate the clarity and conciseness required for an understanding of the invention.

TABLE I
LOAD

```
LOAD: PROCEDURE
 LOAD DESCRIPTORS AND BUILD HASH TABLE
DO
 GET STORAGE SPACE NEEDED FOR TASK
 LOAD DESCRIPTORS
 BUILD HASH TABLE
 BUILD MIH
 LINK MIH TO HASH TABLE
END
```

TABLE II
UPDATE

```
UPDATE: PROCEDURE
 UPDATE LIST WITH CHANGED MESSAGE FORMAT
 DESCRIPTORS
DO
 GET STORAGE SPACE FOR NEW HASH TABLE AND MIH
 BUILD NEW HASH TABLE AND MIH FOR EXISTING
 ENTRIES
END
DO
 GET STORAGE SPACE NEEDED
 LOAD UPDATED MESSAGE FORMAT DESCRIPTORS
 REPLACE OR ADD ENTRY IN NEW HASH TABLE
 AND MIH
 SAVE NEW HASH TABLE POINTER
END
```

TABLE III
ACCESS WITH SWITCHING

```
ACCESS: PROCEDURE
 OBTAIN NAMED DESCRIPTORS WHILE SWITCHING CTB
 HASH TABLE
 POINTER TO ACCESS NEW VERSION OF DESCRIPTORS
DO
 IF AT LOGICAL CHANGE POINT THEN
  IF NEW HASH TABLE AVAILABLE THEN
   IF CURRENT HTP NOT EQUAL TO NEW HTP THEN
   DO
    COMPARE AND SWAP NEW HTP INTO CTB
   END
   ELSE
  ELSE
 ELSE
END
```

With reference now to the figures and to Tables I, II, and III, the operation of the invention will be described.

Table I represents the procedure for initially creating and storing the message format descriptor list 84 and the initial format hash table 81 and MIH 82, representing the index counterpart to the list.

When performing on-line change and additions to message format descriptors in a 24-hour multi-user system with a host computer, an update procedure is used to build and store the new and updated message format descriptors and to create a new index counterpart to the descriptors. In the update procedure, the virtual storage space required for the updating task is obtained, and the new or updated formats are loaded into the obtained space. Next, the new hash table and new MIH are built, and linked to provide the mapping between the message format names produced by the MFS 20 and the message format descriptors. The new or updated names are added to the new hash table, together with the names of formats not being replaced. There are now two hash tables addressing the same message format descriptor list, but any new or altered message format descriptors are found only by way of the new hash table. At this point, since all of the terminal blocks still have pointers to the old hash table, the terminals continue to function as though no update has taken place. This preserves the message characteristics for a message being formatted for input processing at the same time that the message format updating by means of the update procedure is taking place. These ongoing messages are formatted using the previous message format descriptors, which represent data being presented to a terminal user, since they are the same message format descriptors in use when the updating took place.

A change to the use of new or modified formats is exemplified by the ACCESS procedure of Table III. The change can occur at different times for different terminals. For example, once a message being output from the host computer 10 is displayed on a terminal using a given MOD and DOF, that instantiation of input descriptor and format must be used to continue mapping the subsequent input message from the terminal if proper terminal operation is to be assured. This implies that the switch to the new formats can occur at any output operation. Thus, when an application-initiated output message is generated for transmission to the terminal, the access routine can be invoked. In this case, the access procedure first inspects the hash table pointer in the terminal's CTB and, if the pointer is old, automatically updates the pointer. Then, using the new hash table and MIH, the latest versions of the named message format descriptors can be obtained to facilitate formatting of the output message that invoked the ACCESS procedure.

Since the complex change to a new version of message format data has been reduced to the alteration of a single pointer for any given terminal, a simple atomic instruction can be used to change the pointer rather than a complicated lock procedure. By way of setting a framework for an understanding of the use of an atomic procedure to introduce new message format descriptors, reference is made to two atomic instructions: COMPARE AND SWAP (CS) and COMPARE DOUBLE AND SWAP (CDS). Both of these instructions are explained in detail in the IBM System/370 Principles of Operation, IBM Publication GA 22-7000-8.

The CS instruction has the following code representation: CS (Rx, Ry, Si). The CDS command has the form: CDS (Rx, Ry, Si). For the CS instruction, the first and third operands, occupying general registers Rx and Ry, are 32 bits in length. The second operand is a 32-bit word at storage address Si.

For CDS, the first and third operands each occupy an even/odd pair of general registers and are 64 bits in length. Thus, the first operand, for example, could occupy registers R0 and R1, while the third operand may occupy registers R2 and R3. The second operand is a double word occupying a pair of contiguous locations in storage, with the double word storage location address given by Si.

In both the CS and CDS operations, the first and second operands are compared; if equal, the operation succeeds and the third operand is stored at the second-operand location; if unequal, the operation fails and the second operand is loaded into the first operand registers. In the context of the invention, the HTPTR of a CTB is placed into R0, the pointer to the latest version hash table is placed in R2 and the HTPTR is taken as the second operand. In this manner, the pointer to the latest hash table will be placed in the HTPTR field of the terminal control block upon execution of the CS (or CDS) instruction.

The determination of when the HTPTR field of a CTB is to be switched can be left to the system designer or operator. The simplest approach is to perform the switch at logon. Since the hash table pointer is changed only when the updating to the hash table, MIH, and message format descriptors is complete, any terminal logging on after the change gets the new HTPTR and thus the new formats. Another straightforward approach is to make the switch when a transaction indicates that a format command is to be processed. Since the terminal operator is requesting a new format, it is safe to assume that any process he was involved with is complete and new formats can now be used.

It is postulated that virtual storage in the host computer 10 is ample enough to accommodate for a time both the old hash table and MIH and the new hash table and MIH. As terminals switch to the new table, use of the old will diminish, eventually allowing the old table to page out and remain out. If return of the storage occupied by the old hash table and MIH to the available storage pool were deemed necessary, any number of techniques could be employed to determine when the old hash table was no longer being addressed by any terminals, and the storage it and its associated MIH occupied could be freed.

Thus, the technique described for changing message format descriptors allows these descriptors to be altered dynamically in a multi-tasking environment while in use by one or more terminals without the use of locks. This provides a highly efficient method for storing and accessing these formats while using virtual storage paging to maintain the necessary working set of message format descriptors in main storage. This approach has general applicability in situations where the modification activity is low and normal operational performance is of high importance, thus making the use of locks unattractive.

Obviously, many modifications and variations of the described invention are possible in view of these teachings. Therefore, it is anticipated that the invention can be embodied in alternative practices without departing from the spirit or scope of the attached claims.

We claim:

1. In a continuously-operating, multi-tasking computer system which includes a central facility with a data storage facility, a plurality of user terminals and a message exchange facility for conducting a message exchange between the control facility and the user terminals in which a message exchanged between the control facility and a user terminal has a format established by a message format descriptor, a method for changing message format descriptors without stopping operation of the computer system, comprising the steps of:
   defining and storing list of message format descriptors in the data storage facility;
   creating an initial index to the list;
   for a user terminal, establishing a user terminal block at the central facility, the user terminal block including a single index pointer conditioned to identify the initial index;
   during a first message exchange between the central facility and the user terminal which includes transfer of messages formatted according to message format descriptors included in the list accessing the list by way of the initial index in response to the index pointer;
   modifying the list of message format descriptors;
   creating an updated index to the list;
   initiating a second message exchange between the central facility and the user terminal, the message exchange including transfer of messages formatted according to modified message format descriptors included in the list;
   in response to initiating the second message exchange, executing an atomic instruction to condition the index pointer to identify the update index; and
   during the second message exchange, accessing the list by way of the updated index in response to the index pointer.

2. The method of claim 1, wherein each step of creating includes:
   creating a hashing table which includes a plurality of hashing entries, each hashing entry having a predetermined hashing correspondence with one or more of the message format descriptors and each having entry including a header pointer; and
   creating an intermediate data structure which consists of a plurality of header entries, one or more of these entries being indicated by a respective header pointer and each header entry including at least a synonym field for storing the identity of another header entry, a name field for storing the identity of one of the message format descriptors, and a list pointer for indicating the storage location in the data storage facility where the message format descriptor identified in the name field is located.

3. A lock-free method for assuring independent access to different versions of a message descriptor in a list of message descriptors maintained in a data storage facility of a central computer facility to which a plurality of user terminals are connected, the central computer facility including a message exchange facility for conducting message exchange between the control computer facility and the user terminals in which message formats are defined by message descriptors, the method comprising the steps of:
   defining and storing a list of message descriptors in the data storage facility;
   creating a first index to the list of message descriptors;
   providing a terminal block for user terminals exchanging messages with the central facility, each terminal block including a single index pointer conditioned to identify the first index;
   in response to exchange of a first message between a user terminal and a central facility, accessing the list of message descriptors by way of the first index in response to an index pointer in a terminal block for the user terminal;
   updating a message descriptor in the list of message descriptors and adding the updated message descriptor to the list of message descriptors;
   creating a second index to the list of message descriptors including the updated message descriptor;
   in response to exchange of a second message between the user terminal and the central facility, atomically altering the index pointer in the terminal block to identify the second index; and accessing the list of message descriptors by way of the second index in response to the pointer.

4. The method of claim 3, wherein each of said creating steps includes:

creating a hashing table which includes a plurality of having entries, each having entry having a predetermined having correspondence with one or more of the message descriptors and each hashing entry including a header pointer; and creating an intermediate data structure which consists of a plurality of header entries, one or more of these entries being indicated by a respective header pointer and each header entry including at least a synonym field for storing the identity of another header entry, a name field for storing the identity of one of the message descriptors, and a list pointer for indicating the storage location in the data storage facility where the message descriptor identified in the name field is located.

* * * * *